(12) United States Patent
Wei et al.

(10) Patent No.: US 12,062,223 B2
(45) Date of Patent: Aug. 13, 2024

(54) HIGH-RESOLUTION IMAGE MATCHING METHOD AND SYSTEM

(71) Applicant: INSPUR SUZHOU INTELLIGENT TECHNOLOGY CO., LTD., Suzhou (CN)

(72) Inventors: Hui Wei, Suzhou (CN); Xiaomin Zhu, Suzhou (CN); Yaqian Zhao, Suzhou (CN); Rengang Li, Suzhou (CN)

(73) Assignee: INSPUR SUZHOU INTELLIGENT TECHNOLOGY CO., LTD., Jiangsu (CN)

( * ) Notice: Subject to any disclaimer, the term of this patent is extended or adjusted under 35 U.S.C. 154(b) by 396 days.

(21) Appl. No.: 17/614,850

(22) PCT Filed: Oct. 31, 2019

(86) PCT No.: PCT/CN2019/114525
§ 371 (c)(1),
(2) Date: Nov. 29, 2021

(87) PCT Pub. No.: WO2021/000471
PCT Pub. Date: Jan. 7, 2021

(65) Prior Publication Data
US 2022/0230412 A1    Jul. 21, 2022

(30) Foreign Application Priority Data

Jun. 29, 2019 (CN) .......................... 201910580849.3

(51) Int. Cl.
*G06V 10/75* (2022.01)
(52) U.S. Cl.
CPC .......... *G06V 10/751* (2022.01); *G06V 10/759* (2022.01)

(58) Field of Classification Search
CPC .. G06V 10/751; G06V 10/759; G06V 10/761; G06V 20/00
See application file for complete search history.

(56) References Cited

U.S. PATENT DOCUMENTS

| 2010/0134496 A1* | 6/2010 | Bhaskaran .............. G06T 3/403 345/428 |
| 2011/0128394 A1* | 6/2011 | Narayanan ............ G06T 3/4076 348/222.1 |

(Continued)

FOREIGN PATENT DOCUMENTS

| CN | 102629374 A | 8/2012 |
| CN | 104156957 A | 11/2014 |

(Continued)

OTHER PUBLICATIONS

China National Intellectual Property Administration (ISA/CN); International Search Report of the International Application No. PCT/CN2019/114525; Date of Mailing: Mar. 30, 2020; pp. 1-3.

(Continued)

*Primary Examiner* — Wesley J Tucker
*Assistant Examiner* — Han Hoang
(74) *Attorney, Agent, or Firm* — Taft Stettinius & Hollister LLP; Stephen F. Rost

(57) ABSTRACT

A high-resolution image matching method and system are provided. The method includes performing regional fidelity down-sampling on an initial high-resolution image to obtain a multi-level low-resolution image, performing local matching on the obtained multi-level low-resolution images using a method with global probes to obtain a matching result of the low-resolution images, and performing reverse refinement on the obtained matching result of the low-resolution image using overall consistency of the image matching, to obtain the matching results of the high-resolution images at all levels until the matching results of the initial resolution (Continued)

images are obtained, so as to reduce the computational complexity of the image matching process and improve the accuracy of the matching result, and then the matching result of the high-resolution image is obtained through reverse refinement based on the overall consistency.

4 Claims, 5 Drawing Sheets

(56) References Cited

U.S. PATENT DOCUMENTS

| | | | |
|---|---|---|---|
| 2015/0003725 A1 | 1/2015 | Wan | |
| 2016/0063675 A1* | 3/2016 | Hu | G06T 3/4007 |
| | | | 345/667 |
| 2016/0239944 A1* | 8/2016 | Bedi | G06V 10/462 |
| 2018/0240247 A1* | 8/2018 | Cutu | G06T 7/593 |

FOREIGN PATENT DOCUMENTS

| | | |
|---|---|---|
| CN | 105335952 A | 2/2016 |
| CN | 105466399 A | 4/2016 |
| CN | 105488776 A | 4/2016 |
| CN | 108010082 A | 5/2018 |
| CN | 108460795 A | 8/2018 |
| CN | 108492326 A | 9/2018 |
| CN | 108682029 A | 10/2018 |
| CN | 109711457 A | 5/2019 |
| CN | 110363235 A | 10/2019 |

OTHER PUBLICATIONS

China National Intellectual Property Administration (ISA/CN); Written Opinion of the International Application No. PCT/CN2019/114525; Date of Mailing: Mar. 30, 2020; pp. 1-5.

The State Intellectual Property Office of People's Republic of China; First Office Action of the corresponding Application No. 201910580849.3; pp. 1-11; Issuing Date: Jan. 28, 2021.

Samsung Advanced Institute of Technology, China Lab, LIAMA-NLPR, Institute of Automation, Chinese Academy of Sciences; "On Building an Accurate Stereo Matching System on Graphics Hardware", Xing Mei, et al.; 2011 IEEE, 978-1-4673-0063-6/11; pp. 467-474.

International Search Report & Written Opinion, PCT/CN2019/114525, China National Intellectual Property Administration, Mar. 30, 2020, 9 pages.

* cited by examiner

HIGH-RESOLUTION IMAGE MATCHING METHOD AND SYSTEM

This application is a U.S. national stage application under 35 U.S.C. § 371 of PCT International Application Serial No. PCT/CN2019/114525, which has an international filing date of Oct. 31, 2019, designates the United States of America, and claims the benefit of CN201910580849.3, which was filed on Jun. 29, 2019, the disclosures of which are hereby expressly incorporated by reference in their entirety.

TECHNICAL FIELD

The present invention belongs to the technical field of image processing, in particular to a high-resolution image matching method and system.

BACKGROUND

Vision-based depth perception is an underlying general supporting technology with common applications in many fields such as autonomous driving, industrial inspection, robotics, augmented reality, and unmanned aerial vehicle. Compared with other depth perception means, visual depth perception has the advantages of being able to obtain dense data, high accuracy, low cost, and good applicability. However, because of the matching problem between images involved, visual depth perception also has the problem of high computational complexity, and faces large problems in many fields that generally require real-time response. In the current application of visual depth perception technology, in order to ensure instantaneity, the matching of low-resolution images can only be supported generally, resulting in the inability to take full use of the performance of the current high-resolution camera equipment, and only lower accuracy and depth data of smaller distance can be obtained.

Currently, there are two main types of methods for image matching for visual depth perception: the local method and the global method. As to the local method, through a method of comparison pixel by pixel, pixels corresponding to the same target are searched in two images to form a matching relationship between the pixels of the two images, so as to calculate the corresponding parallax and depth data; this method faces a large number of pixel alignment calculations, which is computationally intensive, and can only support low-resolution image matching in order to ensure instantaneity. As to the global method, the image matching is converted into an optimization problem through finding the optimal solution in the global range to achieve the matching between images. Since global optimization involves the design of a large number of parameters and the solution of the optimal solution is very complex and unstable, this method is more effective than the local method, but it also faces the problem of a more complicated computational process. Combining the characteristics of these two methods, a semi-global optimization method has emerged, this method and the local method adopt pixel-by-pixel alignment to achieve the image matching calculation, but obtain the optimized parallax results in several directions through optimization means, thereby improving the accuracy of parallax values. To some extent, the semi-global optimization method improves the problems of low accuracy of the local method and the complexity of the calculation of the global method, but it does not completely solve the problems of matching and long-distance depth perception of high-resolution images.

SUMMARY OF THE INVENTION

Aiming at the shortcomings in the prior art, the present invention provides a high-resolution image matching method that can both reduce the computational volume of the image matching process and improve the accuracy of the matching results, and then obtain the matching results of high-resolution images by reverse refinement based on the overall consistency.

The technical solution provided in the present invention is as follows: a high-resolution image matching method, wherein the method includes the following steps:

performing regional fidelity down-sampling on an initial high-resolution image to obtain a multi-level low-resolution image;

performing local matching on the obtained multi-level low-resolution image using a method with global probes to obtain a matching result of the low-resolution image; and performing reverse refinement on the obtained matching result of the low-resolution image using overall consistency of the image matching, to obtain the matching results of the high-resolution images at all levels until the matching results of the initial resolution images are obtained.

As an improved solution, the step of performing regional fidelity down-sampling on an initial high-resolution image to obtain a multi-level low-resolution image specifically includes the following steps:

initializing the value of the number of pixels R, wherein the number of pixels R is taken as a sampling stopping condition;

taking the obtained value of the number of pixels R as the pixel value at the corresponding position of the next level of resolution image; and performing the above down-sampling process in sequence, until the obtained image resolution satisfies the sampling stopping condition, and stopping the sampling process, wherein the finally obtained image is the lowest-resolution image.

As an improved solution, in the initial high-resolution image process, the information of four pixels adjacent to each other above and below and on the left and right is synthesized to obtain a value, and each obtained value contains the information of the four adjacent images.

As an improved solution, the step of performing local matching on the obtained multi-level low-resolution image using a method with global probes to obtain a matching result of the low-resolution image specifically includes the following steps:

initializing the number, direction and length of global probes;

performing pixel-by-pixel matching on the obtained lowest-resolution image, and calculating to obtain the matching cost corresponding to each matching result;

calculating the size relationship between the pixel value and the center pixel value of each position of the lowest-resolution image on the probe according to the determined number, direction and length of probes, and representing in a binary value;

calculating the distance between the probes corresponding to all the pixels to be matched;

performing weighted summation on each pixel to be matched based on the calculated matching cost corresponding to each matching result and the obtained distance between corresponding probes, wherein the obtained weighted summation result is taken as the final matching cost of each pixel to be matched; and selecting the candidate pixel with the lowest matching cost as the final matching result of the low-resolution image.

As an improved solution, the step of performing reverse refinement on the obtained matching result of the low-resolution image using overall consistency of the image matching, to obtain the matching results of the high-resolution images at all levels until the matching results of the initial resolution images are obtained specifically includes the following steps:

in the obtained matching result of the lower-resolution image, performing pairing processing on each matched pixel to find their respective corresponding pixel regions in the upper level of resolution image;

performing a matching calculation on the pixels within the region for the corresponding pixel region in the obtained upper level of resolution image, to obtain the optimal pixel matching relationship within the pixel region;

determining the obtained optimal pixel matching relationship within the pixel region as the matching relationship between the current resolution images; and cyclically performing the operation steps of matching calculation of the optimal pixel matching relationship within the pixel region and determination of the matching relationship between the current resolution images, until the matching result of the highest-resolution image is obtained and taken as the final initial resolution image matching result.

Another objective of the present invention provides a high-resolution image matching system, and the system includes:

a down-sampling module, configured to perform regional fidelity down-sampling on an initial high-resolution image to obtain a multi-level low-resolution image;

a local matching module, configured to perform local matching on the obtained multi-level low-resolution image using a method with global probes to obtain a matching result of the low-resolution image; and a reverse refinement module, configured to perform reverse refinement on the obtained matching result of the low-resolution image using overall consistency of the image matching, to obtain the matching results of the high-resolution images at all levels until the matching results of the initial resolution images are obtained.

As an improved solution, the down-sampling module specifically includes:

a value initialization module, configured to initialize the value of the number of pixels R, wherein the number of pixels R is taken as a sampling stopping condition;

a pixel value determination module, configured to take the obtained value of the number of pixels R as the pixel value at the corresponding position of the next level of resolution image; and a lowest-resolution image acquisition module, configured to perform the above down-sampling process in sequence, until the obtained image resolution satisfies the sampling stopping condition, and stop the sampling process, wherein the finally obtained image is the lowest-resolution image.

As an improved solution, in the initial high-resolution image process, the information of four pixels adjacent to each other above and below and on the left and right is synthesized to obtain a value, and each obtained value contains the information of the four adjacent images.

As an improved solution, the local matching module specifically includes:

a probe initialization module, configured to initialize the number, direction and length of global probes;

a pixel matching module, configured to perform a pixel-by-pixel matching on the obtained lowest-resolution image, and calculate to obtain the matching cost corresponding to each matching result;

a size relationship calculation module, configured to calculate the size relationship between the pixel value and the center pixel value of each position of the lowest-resolution image on the probe according to the determined number, direction and length of probes, and represent in a binary value;

a probe distance calculation module, configured to calculate the distance between the probes corresponding to all the pixels to be matched;

a final matching cost calculation module, configured to perform weighted summation on each pixel to be matched based on the calculated matching cost corresponding to each matching result and the obtained distance between corresponding probes, wherein the obtained weighted summation result is taken as the final matching cost of each pixel to be matched; and a final matching result determination module, configured to select the candidate pixel with the lowest matching cost as the final matching result of the low-resolution image.

As an improved solution, the reverse refinement module specifically includes:

a pairing processing module, configured to perform pairing processing on each matched pixel in the obtained matching result of the lower-resolution image to find their respective corresponding pixel regions in the upper level of resolution image;

an optimal pixel matching relationship calculation module, configured to perform a matching calculation on the pixels within the region for the corresponding pixel region in the obtained upper level of resolution image, to obtain the optimal pixel matching relationship within the pixel region;

a matching relationship determining module, configured to determine the obtained optimal pixel matching relationship within the pixel region as the matching relationship between the current resolution images; and a cyclically performing module, configured to cyclically perform the operation steps of matching calculation of the optimal pixel matching relationship within the pixel region and determination of the matching relationship between the current resolution images, until the matching result of the highest-resolution image is obtained and taken as the final initial resolution image matching result.

In the embodiment of the present invention, the initial high-resolution image is subjected to regional fidelity down-sampling to obtain a multi-level low-resolution image; local matching is performed on the obtained multi-level low-resolution image using a method with global probes to obtain a matching result of the low-resolution image; and reverse refinement is performed on the obtained matching result of the low-resolution image using overall consistency of the image matching, to obtain the matching results of the high-resolution images at all levels until the matching results of the initial resolution images are obtained, so as to reduce the computational volume of the image matching process and improve the accuracy of the matching result, and then the matching result of the high-resolution image is obtained through reverse refinement based on the overall consistency.

BRIEF DESCRIPTION OF THE DRAWINGS

In order to more clearly illustrate the technical solutions in the specific embodiments of the present invention or the prior art, a brief introduction will be given below on the accompanying drawings that need to be used in the description of the specific embodiments or the prior art. In all the accompanying drawings, similar elements or portions are generally identified by similar reference numerals. In the accompanying drawings, each element or portion is not necessarily drawn according to actual scales.

DETAILED DESCRIPTION OF THE EMBODIMENTS

The embodiments of the technical solutions of the present invention will be described in detail below in combination with the accompanying drawings. The following embodiments are merely used to illustrate the technical solutions of the present invention more clearly, and are therefore only used as examples and cannot be used to limit the protection scope of the present invention.

Figure 1:
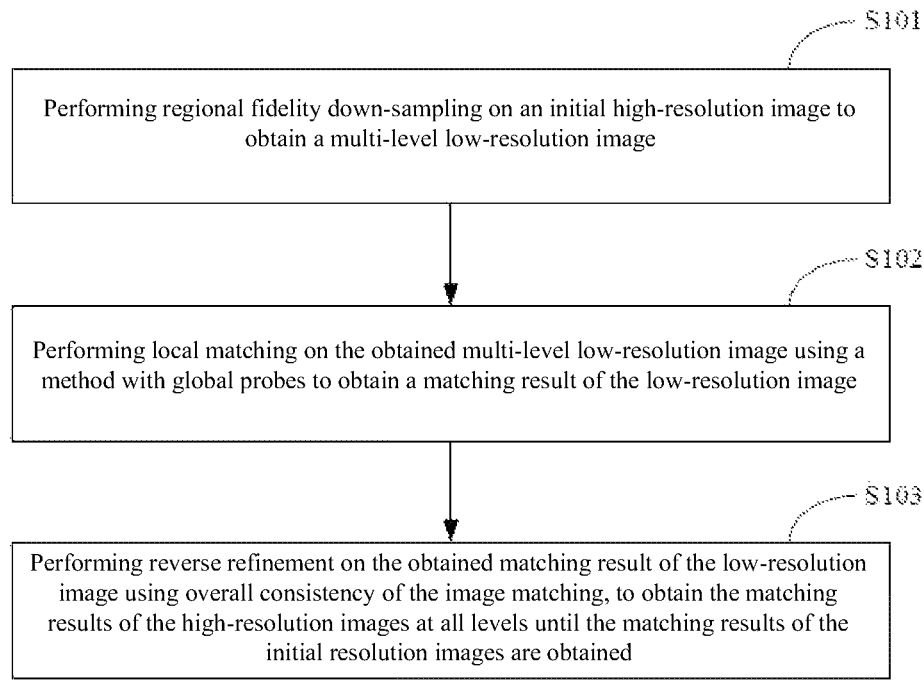
FIG. 1 is a flow chart of implementation of a high-resolution image matching method provided in the present invention.

FIG. 1 shows a flow chart of implementation of a high-resolution image matching method provided in the present invention, and the method specifically includes the following steps:

In step S101, regional fidelity down-sampling is performed on an initial high-resolution image to obtain a multi-level low-resolution image.

In step S102, local matching is performed on the obtained multi-level low-resolution image using a method with global probes to obtain a matching result of the low-resolution image.

In step S103, reverse refinement is performed on the obtained matching result of the low-resolution image using overall consistency of the image matching, to obtain the matching results of the high-resolution images at all levels until the matching results of the initial resolution images are obtained.

In the present embodiment, a regional fidelity down-sampling strategy is designed to convert high-resolution images into low-resolution images while maintaining more image information. The image matching method with global probes is proposed to optimize the matching accuracy using global probes and reduce the mis-matching caused by local similarity. A reverse refinement method based on the overall consistency is designed to optimize the corresponding process of matching results of low-resolution images to matching results of high-resolution images, to further improve the matching accuracy of high-resolution images.

Figure 2:
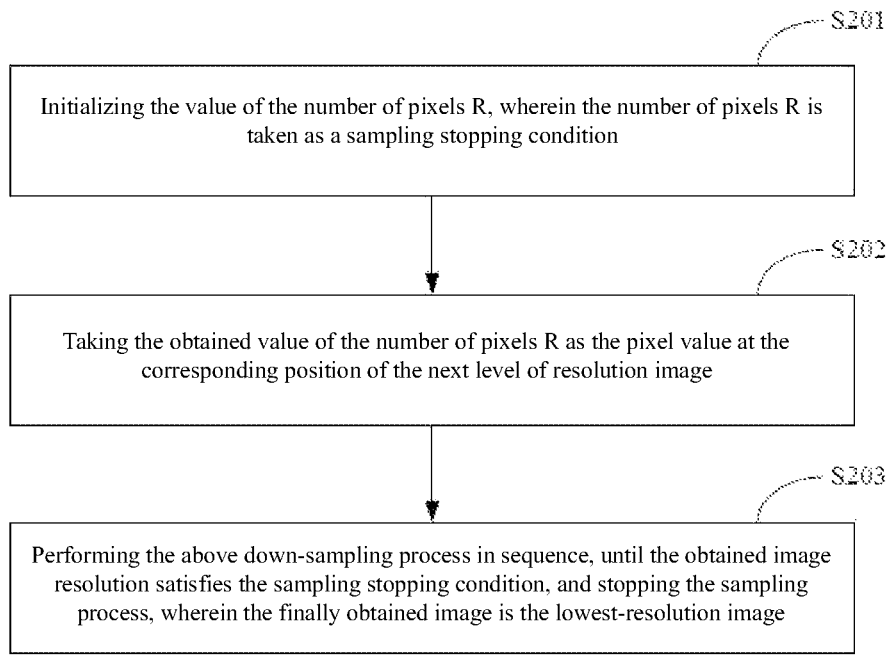
FIG. 2 is a flow chart of implementation of performing regional fidelity down-sampling on an initial high-resolution image to obtain a multi-level low-resolution image provided in the present invention.

FIG. 2 shows a flow chart of implementation of performing regional fidelity down-sampling on an initial high-resolution image to obtain a multi-level low-resolution image provided in the present invention, and the method specifically includes the following steps:

In step S201, the value of the number of pixels R is initialized, and the number of pixels R is taken as a sampling stopping condition.

In step S202, the obtained value of the number of pixels R is taken as the pixel value at the corresponding position of the next level of resolution image.

In step S203, the above down-sampling process is performed in sequence, until the obtained image resolution satisfies the sampling stopping condition, and the sampling process is stopped, wherein the finally obtained image is the lowest-resolution image.

Wherein in the present embodiment, in the initial high-resolution image process, the information of four pixels adjacent to each other above and below and on the left and right is synthesized to obtain a value, and each obtained value contains the information of the four adjacent images, to ensure that local regional information can be maintained in the next level of pixel.

Figure 5:
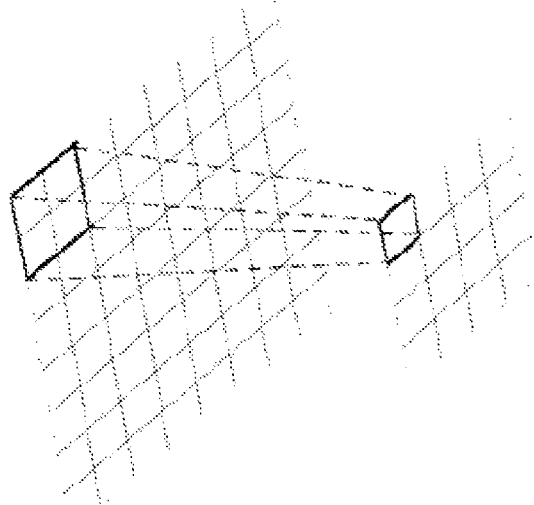
FIG. 5 is a schematic diagram of the flow of regional fidelity down-sampling provided in the present invention.

In the present embodiment, as shown in FIG. 5, as to the regional fidelity down-sampling strategy, the high-resolution image is changed to low-resolution image, and more image information can be maintained.

Figure 3:
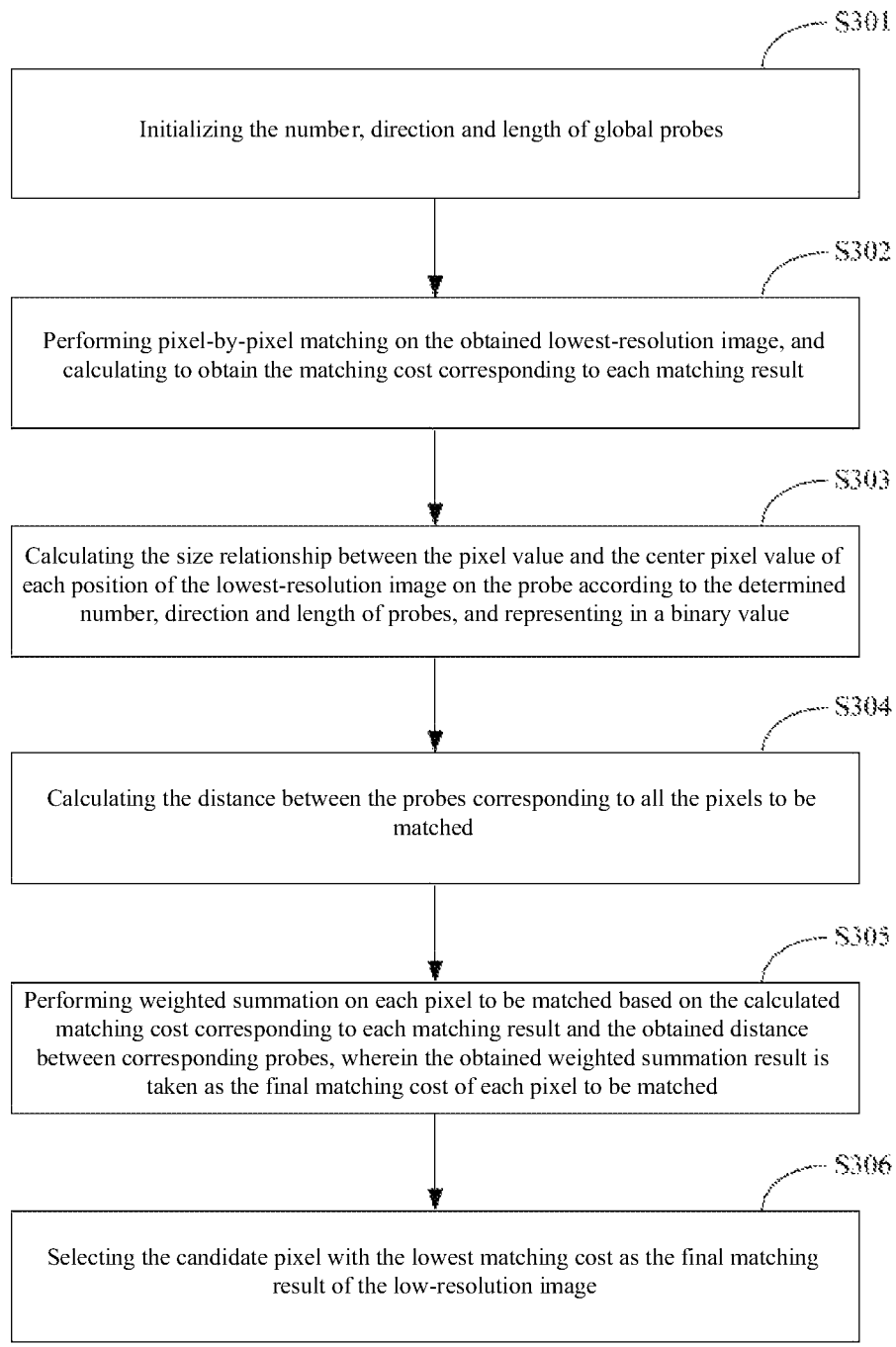
FIG. 3 is a flow chart of implementation of performing local matching on the obtained multi-level low-resolution image using a method with global probes to obtain a matching result of the low-resolution image provided in the present invention.

FIG. 3 shows a flow chart of implementation of performing local matching on the obtained multi-level low-resolution image using a method with global probes to obtain a matching result of the low-resolution image provided in the present invention, and the steps specifically includes the following steps:

In step S301, the number, direction and length of global probes are initialized;

in this step, the global probes can be four-way, eight-way probes, etc., and the number is optional. The direction can be along the axis alignment direction, diagonal direction, or any other directions. The probe length can extend to the edge of the image, or to extend to the middle of the image.

In step S302, pixel-by-pixel matching is performed on the obtained lowest-resolution image, and the matching cost corresponding to each matching result is obtained through calculation;

in this step, the matching window can be selected as a regular shape, and can also be an adaptive irregular shape or any other shape. The matching cost can be calculated directly based on pixel values, or any method such as non-parametric transformation based on pixel values can be adopted.

In step S303, the size relationship between the pixel value and the center pixel value of each position of the lowest-resolution image on the probe is calculated according to the determined number, direction and length of probes, and is represented in a binary value;

the size relationship values between all the pixels on each probe and the center pixel form a binary string according to the pixel position.

In step S304, the distance between corresponding probes is calculated for all the pixels to be matched;

in this step, the calculation of the distance between probes can be done using the Hamming distance or any other distance calculation method.

In step S305, weighted summation is performed on each pixel to be matched based on the calculated matching cost corresponding to each matching result and the obtained distance between corresponding probes, wherein the obtained weighted summation result is taken as the final matching cost of each pixel to be matched;

in step S306, the candidate pixel with the lowest matching cost is selected as the final matching result of the low-resolution image.

Figure 6:
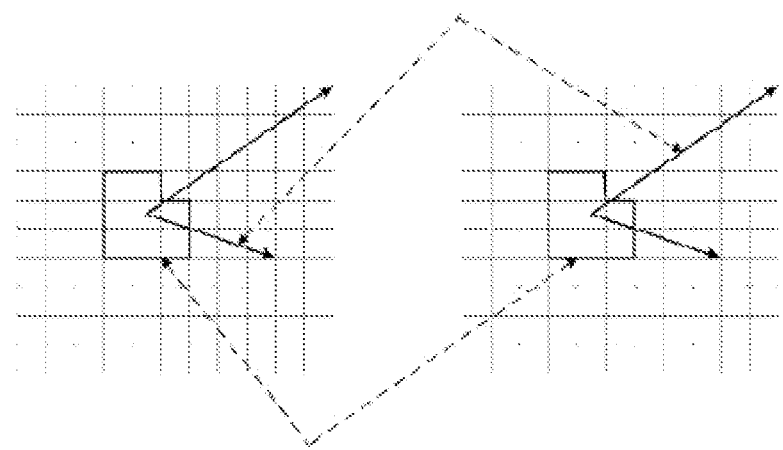
FIG. 6 is a schematic diagram of a process of regional matching with global probes provided in the present invention.

In the present embodiment, as shown in FIG. 6, a high-precision local matching method with global probes is designed to jointly determine the optimal matching pair by calculating the local matching degree and the global matching degree of the current match to avoid getting into a mis-match caused by local similarity.

Figure 4:
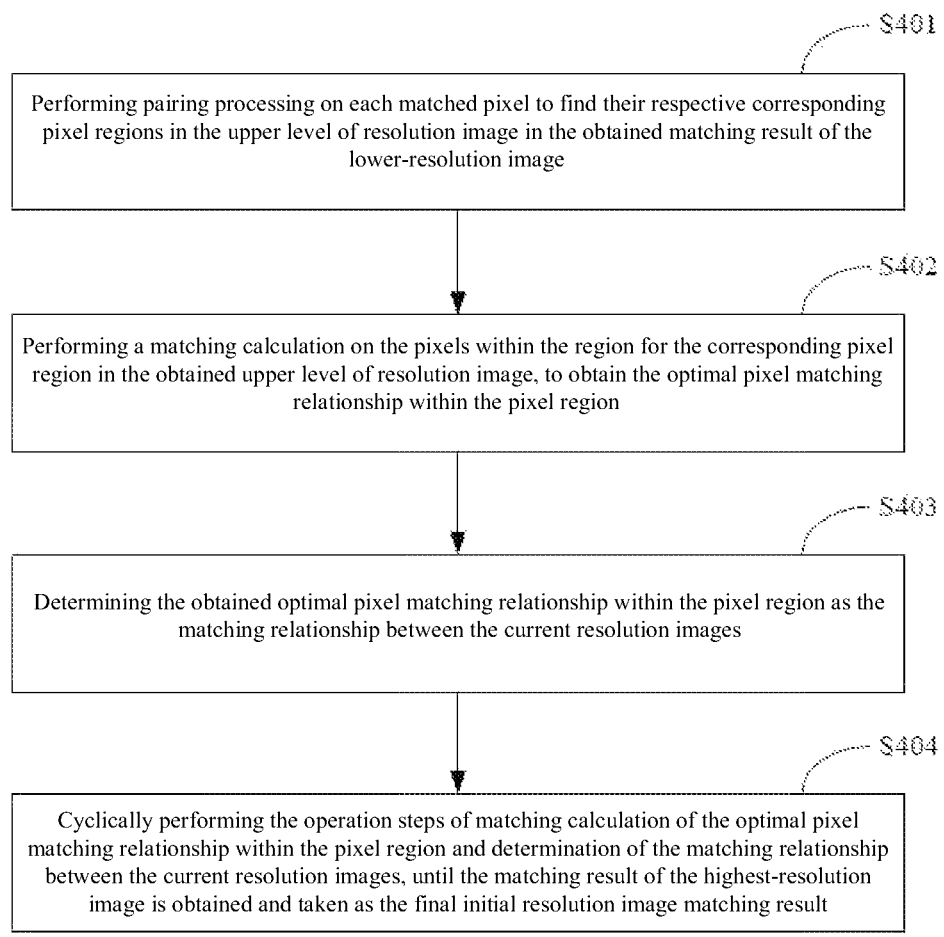
FIG. 4 is a flow chart of implementation of performing reverse refinement on the obtained matching result of the low-resolution image using overall consistency of the image matching, to obtain the matching results of the high-resolution images at all levels until the matching results of the initial resolution images are obtained provided in the present invention.

FIG. 4 shows a flow chart of implementation of performing reverse refinement on the obtained matching result of the low-resolution image using overall consistency of the image matching, to obtain the matching results of the high-resolution images at all levels until the matching results of the initial resolution images are obtained provided in the present invention, which specifically includes the following steps:

in step S401, in the obtained matching result of the lower-resolution image, pairing processing is performed on each matched pixel to find their respective corresponding pixel regions in the upper level of resolution image;

in this step, the correspondence of pixels between different levels of resolution images can maintain corresponding data during the down-sampling process in step 1, or the correspondence data can also be obtained in other ways.

In step S402, a matching calculation is performed on the pixels within the region for the corresponding pixel region in the obtained upper level of resolution image, to obtain the optimal pixel matching relationship within the pixel region;

in this step, the matching calculation can be done in the same method as the matching calculation in step 2, or any other method can also be adopted. The optimal pixel matching relationship in the pixel region is obtained through the matching calculation.

In step S403, the obtained optimal pixel matching relationship within the pixel region is determined as the matching relationship between the current resolution images;

this process completes the transition from the pixel matching relationship of low-resolution images to the pixel matching relationship of high-resolution images, instead of directly using the correspondence between pixels of different resolution images as the matching result of high-resolution images.

In step S404, the operation steps of matching calculation of the optimal pixel matching relationship within the pixel region and determination of the matching relationship between the current resolution images are cyclically performed, until the matching result of the highest-resolution image is obtained and taken as the final initial resolution image matching result.

Figure 7:
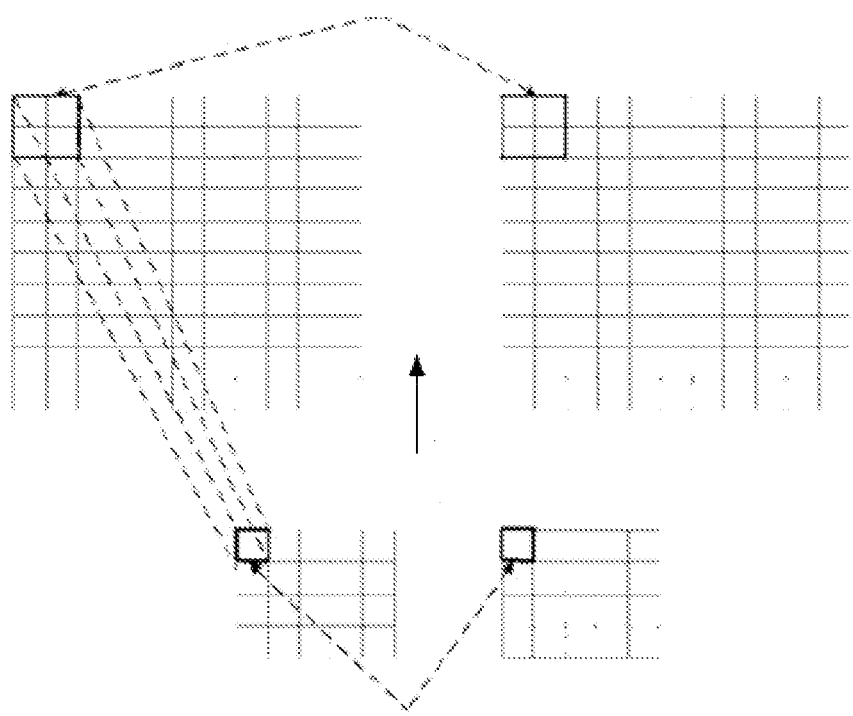
FIG. 7 is a schematic diagram of matching results in the low-resolution image provided in the present invention.

In the present embodiment, as shown in FIG. 7, for the introduction error that may be caused in the sampling process, the present invention designs a reverse refinement method based on the overall consistency, and based on the matching result of the low-resolution image and the overall consistency in image matching, the matching relationship corresponding to the high-resolution image is obtained by local refinement of the region in which the pixel is located.

Figure 8:
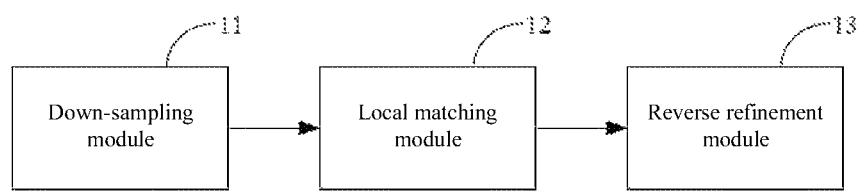
FIG. 8 is a structural block diagram of a high-resolution image matching system provided in the present invention.

FIG. 8 shows a structural block diagram of a high-resolution image matching system provided in the present invention, to facilitate description, the figure merely gives the part related to the embodiment of the present invention.

The high-resolution image matching system includes:
a down-sampling module 11, configured to perform regional fidelity down-sampling on an initial high-resolution image to obtain a multi-level low-resolution image;
a local matching module 12, configured to perform local matching on the obtained multi-level low-resolution image using a method with global probes to obtain a matching result of the low-resolution image; and
a reverse refinement module 13, configured to perform reverse refinement on the obtained matching result of the low-resolution image using overall consistency of the image matching, to obtain the matching results of the high-resolution images at all levels until the matching results of the initial resolution images are obtained.

Figure 9:
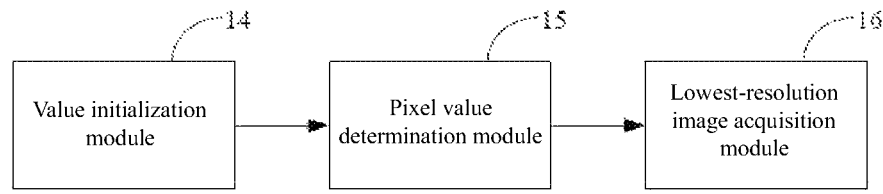
FIG. 9 is a structural block diagram of a down-sampling module provided in the present invention.

As shown in FIG. 9, the down-sampling module 11 specifically includes:
a value initialization module 14, configured to initialize the value of the number of pixels R, wherein the number of pixels R is taken as a sampling stopping condition;
a pixel value determination module 15, configured to take the obtained value of the number of pixels R as the pixel value at the corresponding position of the next level of resolution image; and
a lowest-resolution image acquisition module 16, configured to perform the above down-sampling process in sequence, until the obtained image resolution satisfies the sampling stopping condition, and stop the sampling process, wherein the finally obtained image is the lowest-resolution image.

Figure 10:
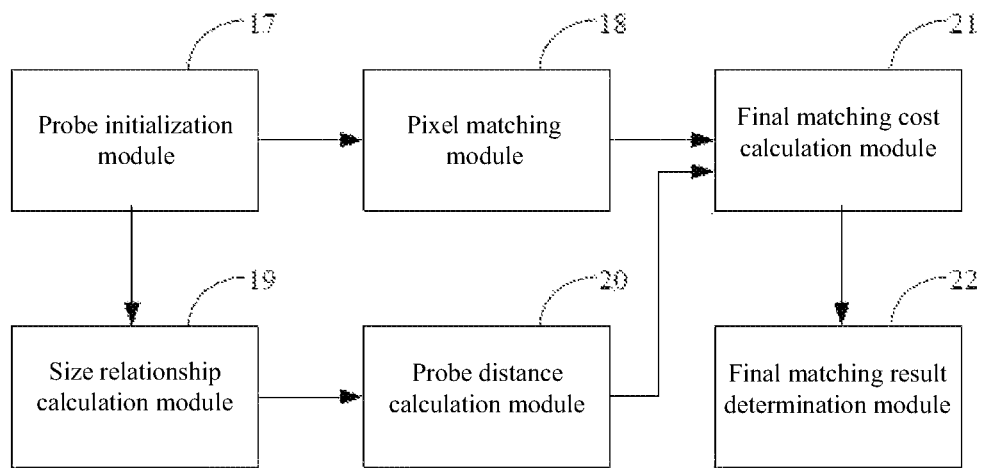
FIG. 10 is a structural block diagram of a local matching module provided in the present invention.

As shown in FIG. 10, the local matching module 12 specifically includes:
a probe initialization module 17, configured to initialize the number, direction and length of global probes;
a pixel matching module 18, configured to perform a pixel-by-pixel matching on the obtained lowest-resolution image, and calculate to obtain the matching cost corresponding to each matching result;
a size relationship calculation module 19, configured to calculate the size relationship between the pixel value and the center pixel value of each position of the lowest-resolution image on the probe according to the determined number, direction and length of probes, and represent in a binary value;

a probe distance calculation module 20, configured to calculate the distance between the probes corresponding to all the pixels to be matched;

a final matching cost calculation module 21, configured to perform weighted summation on each pixel to be matched based on the calculated matching cost corresponding to each matching result and the obtained distance between corresponding probes, wherein the obtained weighted summation result is taken as the final matching cost of each pixel to be matched; and a final matching result determination module 22, configured to select the candidate pixel with the lowest matching cost as the final matching result of the low-resolution image.

Figure 11:
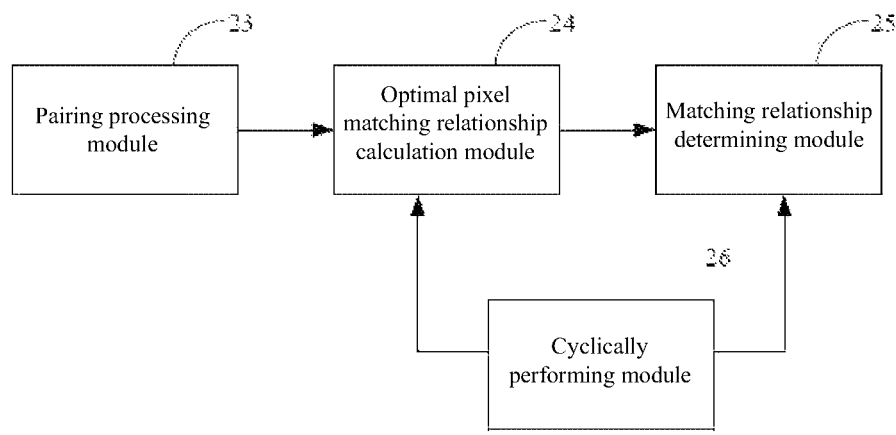
FIG. 11 is a structural block diagram of a reverse refinement module provided in the present invention.

As shown in FIG. 11, the reverse refinement module 13 specifically includes:

a pairing processing module 23, configured to perform pairing processing on each matched pixel in the obtained matching result of the lower-resolution image to find their respective corresponding pixel regions in the upper level of resolution image;

an optimal pixel matching relationship calculation module 24, configured to perform a matching calculation on the pixels within the region for the corresponding pixel region in the obtained upper level of resolution image, to obtain the optimal pixel matching relationship within the pixel region;

a matching relationship determining module 25, configured to determine the obtained optimal pixel matching relationship within the pixel region as the matching relationship between the current resolution images; and a cyclically performing module 26, configured to cyclically perform the operation steps of matching calculation of the optimal pixel matching relationship within the pixel region and determination of the matching relationship between the current resolution images, until the matching result of the highest-resolution image is obtained and taken as the final initial resolution image matching result.

The functions of each of the above modules are as recorded in the above method embodiments and will not be repeated redundantly herein.

In the embodiment of the present invention, the initial high-resolution image is subjected to regional fidelity down-sampling to obtain a multi-level low-resolution image; local matching is performed on the obtained multi-level low-resolution image using a method with global probes to obtain a matching result of the low-resolution image; and reverse refinement is performed on the obtained matching result of the low-resolution image using overall consistency of the image matching, to obtain the matching results of the high-resolution images at all levels until the matching results of the initial resolution images are obtained, so as to reduce the computational volume of the image matching process and improve the accuracy of the matching result, and then the matching result of the high-resolution image is obtained through reverse refinement based on the overall consistency.

The above embodiments are merely used to illustrate rather than limiting the technical solution of the present invention; although the present invention is described in detail with reference to the preceding embodiments, it should be understood by those of ordinary skills in the art that the technical solutions recorded in the preceding embodiments can be modified, or part or all of the technical features therein can be equivalently substituted; and these modifications or substitutions do not make the essence of corresponding technical solutions depart from the scope of the technical solutions of each embodiment in the present invention, and such modifications or substitutions shall all fall within the scope of the claims and specification of the present invention.

The invention claimed is:

1. A high-resolution image matching method, comprising the following steps:

performing regional fidelity down-sampling on an initial high-resolution image to obtain a multi-level low-resolution image;

performing local matching on the obtained multi-level low-resolution images using a method with global probes to obtain a matching result of the low-resolution image; and performing reverse refinement on the obtained matching result of the low-resolution image using overall consistency of the image matching, to obtain the matching results of the high-resolution images at all levels until the matching results of the initial resolution images are obtained, wherein, in the obtained matching result of the lower resolution image, performing pairing processing on each matched pixel to find their respective corresponding pixel regions in the upper level of resolution image;

performing a matching calculation on the pixels within the region for the corresponding pixel region in the obtained upper level image of higher resolution, to obtain the optimal pixel matching relationship within the pixel region;

determining the obtained optimal pixel matching relationship within the pixel region as the matching relationship between the current resolution images; and cyclically performing the operation steps of matching calculation of the optimal pixel matching relationship within the pixel region and determination of the matching relationship between the current resolution images, until the matching result of the highest resolution image is obtained and taken as the final initial resolution image matching result.

2. The high-resolution image matching method according to claim 1, wherein, the step of performing regional fidelity down-sampling on an initial high-resolution image to obtain a multi-level low-resolution image specifically comprises the following steps:

initializing the value of the number of pixels R, wherein the number of pixels R is taken as a sampling stopping condition;

taking the obtained value of the number of pixels R as the pixel value at the corresponding position of the next level of resolution image; and performing the above down-sampling process in sequence, until the obtained image resolution satisfies the sampling stopping condition, and stopping the sampling process, wherein the finally obtained image is the lowest resolution image.

3. The high-resolution image matching method according to claim 2, wherein, in the initial high-resolution image process, the information of four pixels adjacent to each other above and below and on the left and right is synthesized to obtain a value, and each obtained value contains the information of the four adjacent images.

4. The high-resolution image matching method according to claim 2, wherein, the step of performing local matching on the obtained multi-level low-resolution image using a method with global probes to obtain a matching result of the low-resolution image specifically comprises the following steps:

initializing the number, direction and length of global probes;

performing a pixel-by-pixel matching on the obtained lowest resolution image, and calculating the matching cost corresponding to each matching result;

calculating the magnitude relationship between the pixel value and the center pixel value of each position of the lowest resolution image on the probe according to the determined number, direction and length of probes, and representing in a binary value;

calculating the distance between the probes corresponding to all the pixels to be matched;

performing weighted summation on each pixel to be matched based on the calculated matching cost corresponding to each matching result and the obtained distance between corresponding probes, wherein the obtained weighted summation result is taken as the final matching cost of each pixel to be matched; and selecting the candidate pixel with the lowest matching cost as the final matching result of the low resolution image.

* * * * *